(12) United States Patent
Ryan et al.

(10) Patent No.: US 8,056,392 B2
(45) Date of Patent: Nov. 15, 2011

(54) METHOD, SYSTEM, AND DEVICE FOR OPTIMIZING A VEHICLE'S SUSPENSION

(75) Inventors: Jeffrey Scott Ryan, Willow Spring, NC (US); Nobuhiko Negishi, Chapel Hill, NC (US)

(73) Assignee: JRI Development Group, LLC, Mooresville, NC (US)

(*) Notice: Subject to any disclaimer, the term of this patent is extended or adjusted under 35 U.S.C. 154(b) by 331 days.

(21) Appl. No.: 12/346,502

(22) Filed: Dec. 30, 2008

(65) Prior Publication Data
US 2009/0171532 A1 Jul. 2, 2009

Related U.S. Application Data

(60) Provisional application No. 61/009,605, filed on Dec. 31, 2007.

(51) Int. Cl.
*G01M 17/04* (2006.01)
(52) U.S. Cl. .................................. 73/11.04; 73/117.03
(58) Field of Classification Search .............. 73/11.04, 73/11.05, 11.07, 11.08, 11.09, 117.01, 117.03
See application file for complete search history.

(56) References Cited

U.S. PATENT DOCUMENTS

| | | | |
|---|---|---|---|
| 4,838,392 A | 6/1989 | Miller et al. | |
| 4,949,989 A * | 8/1990 | Kakizaki et al. | 280/5.519 |
| 5,054,809 A | 10/1991 | Yamaoka et al. | |
| 5,382,045 A * | 1/1995 | Takeda et al. | 280/5.515 |
| 5,396,973 A | 3/1995 | Schwemmer et al. | |
| 5,398,184 A * | 3/1995 | Yamaoka et al. | 701/82 |
| 5,579,229 A | 11/1996 | Maguran, Jr. | |
| 6,516,657 B2 * | 2/2003 | Shirato et al. | 73/117.02 |
| 6,732,033 B2 | 5/2004 | LaPlante et al. | |
| 6,904,344 B2 | 6/2005 | LaPlante et al. | |
| 6,953,108 B2 | 10/2005 | Anderfaas et al. | |
| 6,964,325 B2 | 11/2005 | Maes | |
| 2008/0250844 A1* | 10/2008 | Gartner | 73/11.07 |

* cited by examiner

*Primary Examiner* — Eric S McCall
(74) *Attorney, Agent, or Firm* — Hammer & Associates, P.C.

(57) ABSTRACT

A method, system, and device for optimizing a vehicle's suspension includes: mounting at least one modified passive shock with a plurality of sensors onto a vehicle, where the shock is adjustable for a plurality of damping forces; connecting the shock to an electronic control unit being for adjusting the damping forces of the shock and reading the plurality of sensors; and running the vehicle through a plurality of test cycles where the electronic control unit reading the plurality of sensors during each test cycle and adjusting the shock to a different damping force between each test cycle, where the adjusted shock emulating the damping forces of multiple standard passive shocks.

19 Claims, 6 Drawing Sheets

METHOD, SYSTEM, AND DEVICE FOR OPTIMIZING A VEHICLE'S SUSPENSION

CROSS-REFERENCE TO RELATED APPLICATIONS

This application claims priority to U.S. Provisional Patent Application Ser. No. 61/009,605, filed Dec. 31, 2007, which is incorporated herein by reference.

FIELD OF INVENTION

The instant invention relates to a method, system, and device for optimizing a vehicle's suspension.

BACKGROUND OF THE INVENTION

The present invention relates to a method, system and device for optimizing the suspension of a vehicle, and, in particular for optimizing the suspension of a race car.

In the automobile design industry and in automobile racing, optimizing the suspension of a vehicle is critical to the vehicle's performance. The current practice includes, running the vehicle or race car through a plurality of test cycles using different suspension setups which have to be manually adjusted, and then taking the results of those tests to determine the optimal suspension design. The test cycles could include many different types of tests, including, laps around a test track or a seven post test.

The seven post test is conducted on a seven post shaker, which is also referred to as a seven poster or a shaker rig. The seven post shaker is an expensive piece of test equipment used to perform vehicle dynamics analysis for any vehicles, but is mainly used for racecars. The seven post shaker is comprised of four hydraulic rams, one underneath each wheel and three connected to the chassis. A seven post shaker can apply all vertical forces seen by the car on any road or surface, like a racetrack. This simulates the conditions of driving the car on the road or racetrack without actually driving it on the road or racetrack. Included with the shaker rig are an exceptional amount of controls for the hydraulic system and also many sensors to detect what is happening to the car as it is exposed to the virtual road and the associated forces. These forces include banking loads, lateral load transfer, acceleration, braking and aerodynamic downforce. The seven poster doesn't apply longitudinal or lateral acceleration forces. i.e. there are no rams in either direction. Thus you can simulate the pitch and roll motions including the weight transfer between the wheels but not the reaction forces at the tires and suspension associated with the directions of acceleration, braking or cornering. This analysis allows the chassis engineer to replicate the actual corner loads seen on the road or at the track, and to analyze the interaction between suspension setups and the resulting corner loads. This detailed analysis is especially required at high levels of racing.

The current seven post test is used by a multitude of vehicles for different driving conditions, like racing. There are also earlier versions of the seven post shaker, such as the five post shaker and a four post shaker. The four post shaker is commonly used by vehicle manufacturers to determine if their vehicles will handle specific road inputs. For example, the seven post test is highly used by most NASCAR® teams. Aside from NASCAR®, other racing entities that highly use this advanced technology include Champ Car and the Indy Racing League.

The seven post test is an engineering system unto itself as it places dynamic and quasi-static forces on a vehicle and records the reaction forces that the vehicle puts back into the system. The forces that the seven shaker applies to the vehicle are lift, downforce, pitch, roll, heave, and road surface irregularities. The vehicle's suspension and drivetrain components feel these forces in the form of dynamic input that result in chassis and suspension frequency oscillations (under 30 Hz), and tire, engine, transmission and drive axle vibrations up to 500 Hz. These input forces can be derived from a model of the racetrack, or actual test data recorded from the vehicle as it travels the race track.

When testing on the seven post shaker, all variables are inter-related and can be analyzed while the effects of the actual suspension, tires, etc. installed can be quantified. For example, damping force curve of the suspension can be extracted from the data to understand how installation stiffness and other variables affect the damping force. Vehicle designers can use the results of the testing on the seven post shaker to adjust specific aspects of the vehicle. They can adjust spring rates, shock valving, and many other factors.

Although, the use of electronically adjustable shocks, i.e., active suspensions, is known, a system is needed to try to emulate a passive shock in order to speed up suspension development for those vehicles that can not use active suspensions. Current systems are only designed to use sophisticated control algorithms to improve dynamics via active shocks. However, no shock systems have been used in the development of passive vehicle suspensions. For example, in NASCAR®, and many racing leagues, passive shocks are required by rule. As a result, emulating the actual passive suspensions used on the racecar while testing is crucial to acquiring the most accurate information for optimizing the vehicle's suspension. Another common example of the need for this type of system would be for automobile designs that are designed with passive shock suspensions. Thus, there is clearly a need for a passive shock system that can be used in testing that correlates with the actual shocks used in racing.

One problem with the seven post test is the cost and time associated with testing the vehicle. The cost of testing a vehicle on a seven post machine is very expensive and is typically calculated on a per hour basis. A good portion of the time associated with seven post tests is spent manually adjusting the damping forces of the shocks, or changing out the shocks completely, between each test cycle. The shocks have to be adjusted or changed according to the data collected in order to try to optimize the vehicles suspension by providing different damping forces of each shock. This time is a significant factor in the total price of running a vehicle on a seven post test. Furthermore, most teams have only one seven post rig used to test multiple cars which all need to be tested on the rig before each race, which only compounds the time required for manually adjusting or changing out shocks. Thus time becomes more limited as the seven post is used more extensively for race car development Thus, there is a need to reduce or eliminate the time spent manually adjusting the damping forces of each shock, or manually changing out one or more shocks.

In addition to the time and cost factor associated with manually adjusting and changing the shocks between test cycles, there is also a great risk of human error in manually adjusting or changing the shocks. Any slight human error can greatly reduce the accuracy of the seven post test. Thus, there is a need to improve the accuracy of the testing by reducing or eliminating the risk of human error associated with adjusting or changing the shocks in between test cycles.

Furthermore, the data collected at a standard seven post testing facility is limited to what data the testing facility is capable of collecting. However, the more data collected, the more highly optimized the vehicle's suspension can be equipped, especially, in the racing industry. Thus, there is a need to increase the amount of data collected during testing for further optimizing the vehicle's suspension.

The instant invention is designed to address the above mentioned problems.

SUMMARY OF THE INVENTION

The instant invention is a method, system, and device for optimizing a vehicle's suspension. The method includes: mounting at least one modified passive shock with a plurality of sensors onto a vehicle, where each mounted shock is adjustable for a plurality of damping forces; connecting each mounted shock to an electronic control unit for adjusting the damping forces of each shock and reading the plurality of sensors; and running the vehicle through a plurality of test cycles, including, reading the plurality of sensors for each shock with the electronic control unit during each test cycle, and adjusting at least one shock to a different damping force between each test cycle with the electronic control unit, where the adjusted shock emulates the damping forces of a standard passive shock.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
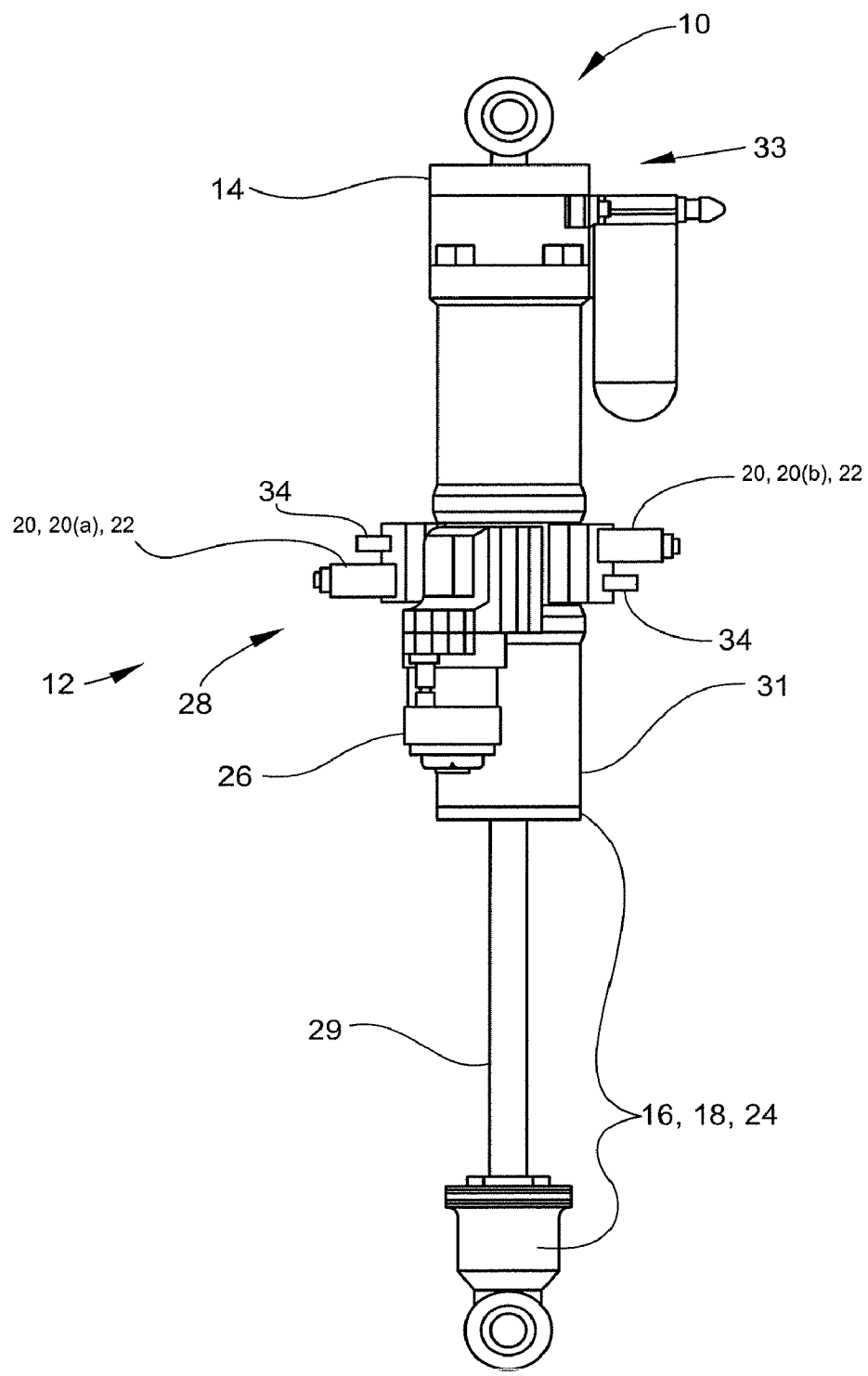
FIG. 1 shows a perspective view of one embodiment of the shock for optimizing a vehicles suspension according to the instant invention.

Referring to the drawings, wherein like numerals indicate like elements, there is shown in FIGS. 1-4 an embodiment of a shock 10 for optimizing a vehicle's suspension. Shock 10 may include a modified passive shock. Shock 10 may be used in optimizing the suspension of any vehicle, including, but not limited to, an automobile 46, and more specifically a racecar. The racecar may be any racecar, including, but not limited to, a NASCAR® racecar. Shock 10 may be used to optimize the suspension of the vehicle utilizing any testing procedure or mechanism, including, but not limited to a seven post shaker, also known as a seven post test. Shock 10 may also be utilized for optimizing the suspension of a vehicle through on-car track testing. Shock 10 may accurately emulate any standard passive shock by duplicating the internal hydraulics of the standard passive shock. The modifications to the passive shock are discussed in great detail below. However, the instant invention is not limited to these modifications and may include any other modifications to any standard passive shock.

Shock 10 may be a modified passive shock. Shock 10 may be a passive shock that can be custom fit into any vehicle. As such, shock 10 may be provided with any number of varying damper lengths and configurations. Shock 10 may include a configuration including a manifold that provides 360 degree rotation. These varying damper lengths and 360 degree rotation of the manifold may allow shock 10 to more easily fit into any vehicle suspension setup, including the most difficult suspension installations, like installations with bumpstops.

In most racing industries, like NASCAR®, a passive shock is required by rules. Shock 10, being a modified passive shock absorber, provides the damping forces equivalent to the damping forces of any standard passive shock, like a competition shock absorber for a racing situation. This may allow the test results of shock 10 to be used as an accurate reading of the test results of any passive shock used in a vehicle, like a competition or racing shock absorber used by a racecar, and more particularly, a NASCAR® racecar. In one embodiment, shock 10 may be a modified stock car shock absorber from any manufacturer. For example, shock 10 may be a modified stock car shock absorber (Part No. SC/07) from JRi® Development Group of Mooresville, N.C.

A plurality of sensors 12 may be included with shock 10, as shown in FIGS. 1-4. Sensors 12 may be any sensors for measuring the performance of shock 10. Shock 10 may include any number of sensors 12. Sensors 12 may also include any type of sensors, including, but not limited to, sensors for measuring damper load, stroke position, stroke velocity, pressure, temperature, sprung and unsprung acceleration, and/or any combination thereof. Modified passive shock 10 may be modified in any way to include the plurality of sensors 12. Sensors 12 may be integral with the housing 31. In one embodiment, a user defined switching threshold may be used to reduce any effect of noise in the signals from sensors 12. In another embodiment, shock 10 may include a load sensor 14, a stroke sensor 16, a velocity sensor 18, a pressure sensor 20, a temperature sensor 22, and an acceleration sensor 24.

Load sensor 14 may be included in shock 10, as shown in FIGS. 1-4. Load sensor 14 may be any sensor for measuring the load placed on shock 10. Load sensor 14 may be positioned anywhere on shock 10 capable of measuring the load applied to shock 10. In one embodiment, load sensor 14 may be positioned on the top of the housing 31 of shock 10. Shock 10 may be modified where load sensor 14 is integral with the end cap 33 of shock 10. Load sensor 14 may be a load cell (part no. F1-229-1245-007/1) provided by Beru F1 Systems of Germany.

Stroke sensor 16 may be included in shock 10 as shown in FIGS. 1-4. Stroke sensor 16 may be any sensor for measuring the strokes performed by shock 10. Stroke sensor 16 may be positioned anywhere on shock 10 capable of measuring the strokes performed by shock 10. Stroke sensor 16 may include any number of desirable features, including, being magnetostrictive. In one embodiment, stroke sensor 16 may include a linear transducer positioned on the inside shock shaft of housing 31 and a linear transducer magnet positioned on the inside bearing carrier at the end of piston rod 29. Stroke sensor 16 may be a linear. transducer (Part No. CS217BV) provided by MTS of Eden Prairie, Minn., and a linear transducer magnet (Part No. 402316) also provided by MTS of Eden Prairie, Minn.

Velocity sensor 18 may be included in shock 10, as shown in FIGS. 1-4. Velocity sensor 18 may be any sensor for measuring the velocity of piston rod 29 inside shock 10. Velocity sensor 18 may be positioned anywhere on shock 10 capable of measuring the velocity of piston rod 29. Velocity sensor 18 may include any number of desirable features, including, being magnetostrictive. In one embodiment, stroke velocity sensor 18 may include a linear transducer positioned on housing 31 on the inside shock shaft and a linear transducer magnet positioned at the end of piston rod 29 on the inside bearing carrier, where the stroke is calculated based on the position of the magnet relative to the transducer. Velocity sensor 18 may be a linear transducer (Part No. CS217BV) provided by MTS of Eden Prairie, Minn., and a linear transducer magnet (Part No. 402316) also provided by MTS of Eden Prairie, Minn.

Figure 2:
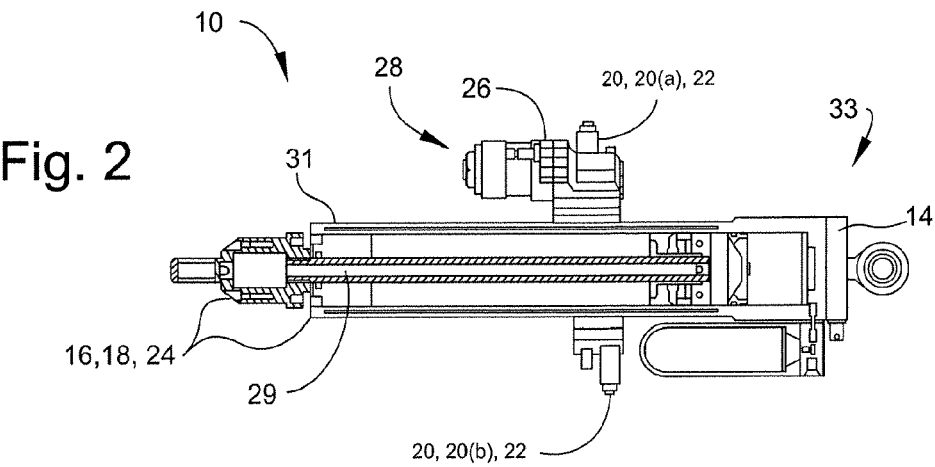
FIG. 2 shows a cross-sectional view of the shock from FIG. 1 with the piston compressed inside the housing.
Figure 3:
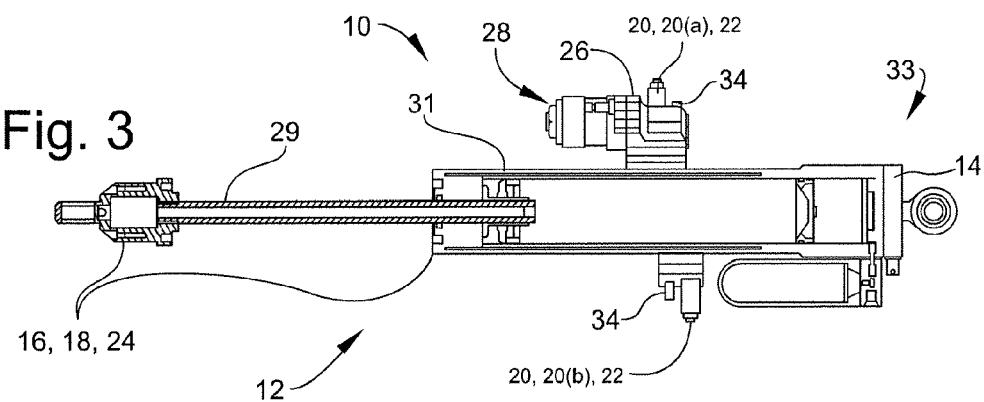
FIG. 3 shows another cross-sectional view of the shock from FIG. 1 with the piston rebounded outside the housing.
Figure 4:
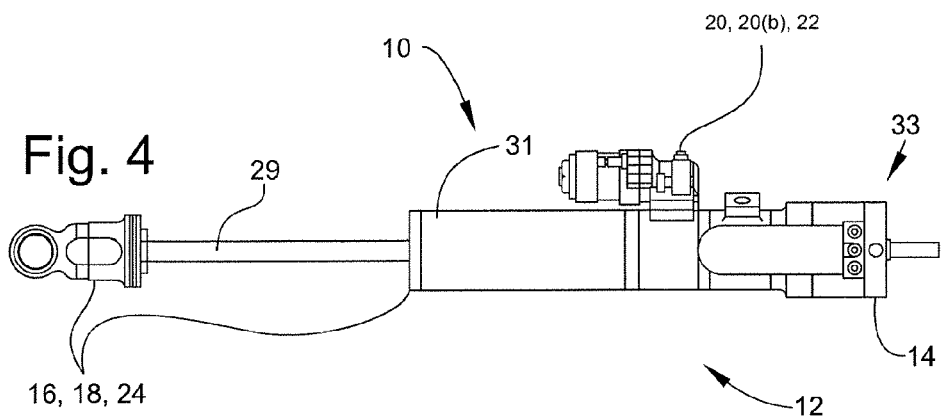
FIG. 4 shows a side view of the shock from FIG. 1.

Pressure sensor 20 may be included in shock 10, as shown in FIGS. 1-3. Pressure sensor 20 may be any sensor for measuring the pressure of either the compression or rebound side of the main piston rod 29 within housing 31 of shock 10. Pressure sensor 20 may be positioned anywhere on shock 10 capable of measuring the pressure of shock 10. In one embodiment, pressure sensor 20 may include two pressure sensors, a compression pressure sensor 20a, and a rebound pressure sensor 20b, as shown in FIGS. 1-3. Compression pressure sensor 20a may be for measuring the pressure in the compression chamber from the bleed circuit 28 of shock 10. Rebound pressure sensor 20b may be for measuring the pressure in the rebound chamber of the bleed circuit 28 of shock 10. Pressure sensors 20a and 20b may be positioned on housing 31, or the center tube manifold of shock 10. Pressure sensor 20 may measure the pressure drop across the piston of shock 10 by calculating the difference between compression pressure sensor 20a and rebound pressure sensor 20b. Pressure sensor 20 may determine if shock 10 is loaded in compression or rebound by determining whether the difference between compression pressure sensor 20a and rebound pressure sensor 20b is positive or negative. Pressure sensors 20a and 20b may each be a pressure sensor (Part No. FG 003 330 052 009) provided by McLaren® Electronics of the United Kingdom.

Temperature sensor 22 may be included in shock 10. Temperature sensor 22 may be any sensor for measuring the temperature of shock 10. Temperature sensor 22 may be positioned anywhere on shock 10 capable of measuring the temperature of shock 10. In one embodiment, temperature sensor 22 may be positioned near the center tube manifold of shock 10. Temperature sensor 22 may be a separate sensor or may be built into any one of the other sensors, including, but not limited to, pressure sensor 20. Temperature sensor 22 may be a pressure sensor provided by McLaren® Electronics (Part no. FG 003 330 052 009) of the United Kingdom.

Acceleration sensor 24 may be included in shock 10. Acceleration sensor 24 may be any sensor for measuring the acceleration of piston rod 29 within shock 10. Acceleration sensor 24 may be positioned anywhere on shock 10 capable of measuring the acceleration of piston rod 29. Acceleration sensor 24 could include two accelerometers for sprung and unsprung accelerations. Acceleration sensor 24 may include any number of desirable features, including, being a MEMS device. In one embodiment, acceleration sensor 24 may include a linear transducer positioned on the inside shock shaft of housing 31 and a linear transducer magnet positioned at the end of piston rod 29 on the inside bearing carrier.

As shown in FIGS. 1-4, stroke sensor 16, velocity sensor 18, and acceleration sensor 24 may all be incorporated into the same sensor. This incorporation may be accomplished by providing a linear transducer positioned inside the shock shaft, and a linear transducer magnet positioned inside the bearing carrier.

A spool valve 26 may also be included in shock 10 as shown in FIGS. 1-6. Spool valve 26 may be for adjusting the damping forces of shock 10 by controlling the openings in the bleed circuit 28 of shock 10. Spool valve 26 may be any device for adjusting the damping forces of shock 10 by controlling the opening 30 in the bleed circuit 28 of shock 10. The bleed circuit 28 may be described as a secondary hydraulic circuit that is parallel to fluid flow through the piston. By controlling the opening 30 in the bleed circuit 28 of shock 10, spool valve 26 may allow shock 10 to be adjustable for a plurality of damping forces. Spool valve 26 may be adjustable in both compression and rebound by providing an opening 30a in the compression side of the bleed circuit 28 (see FIG. 5) and an opening 30b in the rebound side of the bleed circuit 28 (see FIG. 6). Modified passive shock 10 may be modified in any way to include spool valve 26. Modified passive shock 10 may be modified where spool valve 26 is integral to the center tube manifold of housing 31. In one embodiment, spool valve 26 may be controlled by providing different currents to spool valve 26. In this embodiment, spool valve 26 may be a linear force motor driven spool. Spool valve 26 may have many desirable feature, including, but not limited to, adequate performance in extreme motorsports environments, resistance to fluid contamination, and/or excellent high frequency response. In one embodiment, spool valve 26 may be a DDV Miniature Spool Valve (part number E242-0101) provided by Moog® Motorsports of East Aurora, N.Y.

Figure 5:
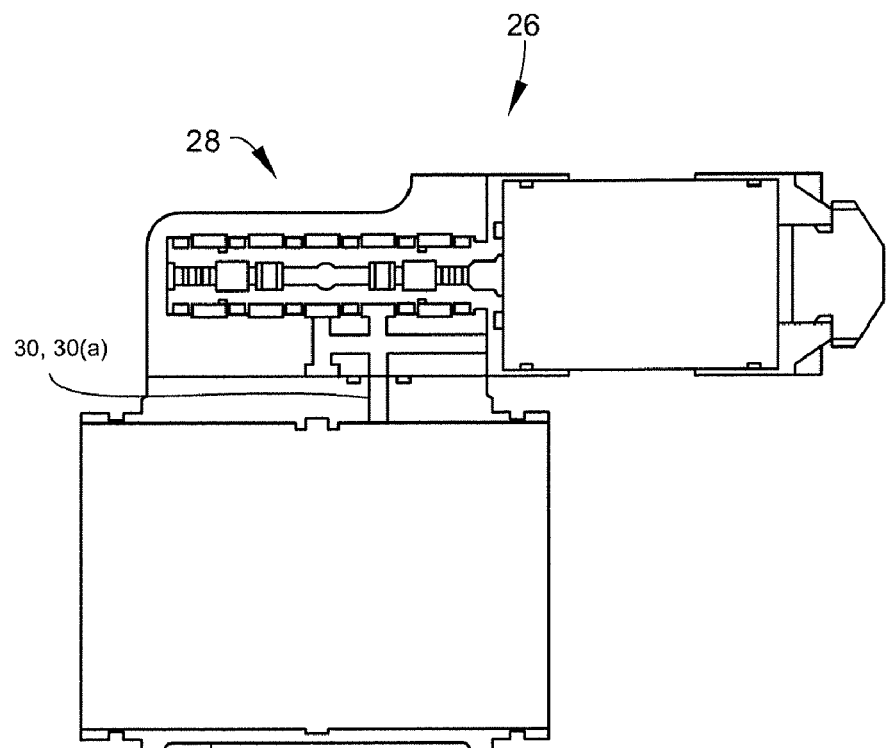
FIG. 5 shows a cross-sectional view of one embodiment of the spool valve according to one embodiment of the instant invention.
Figure 6:
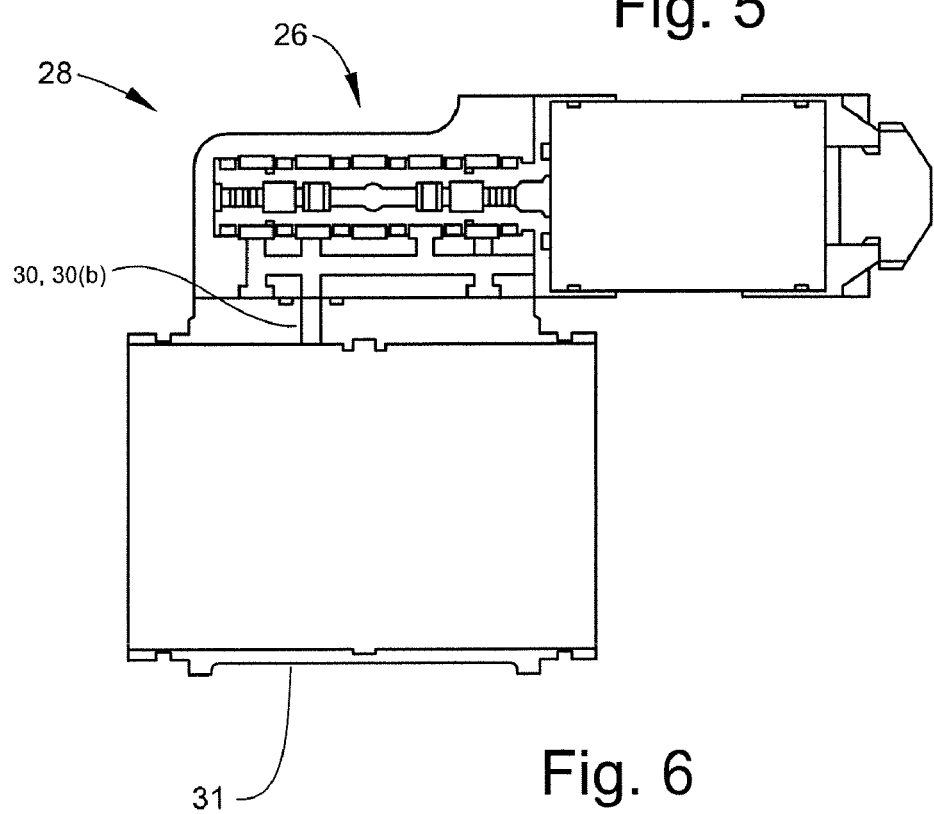
FIG. 6 shows another cross-sectional view of the spool valve From FIG. 5.

Shown in FIGS. 5-6 is the manifold configuration of housing 31 including spool valve 26. In one embodiment, FIG. 5 may show the rebound side of the manifold of housing 31 and FIG. 6 may show the compression side of the manifold of housing 31. This configuration is described as a 2×2 which doubles the flow through spool valve 26. In this embodiment, spool valve 26 may control flow between four ports; pressure, tank, A and B. These ports are located on the cylindrical protrusion off of the motor body. The manifold effectively makes these ports and spool valve 26 control flow between two ports, rebound and compression, making this configuration a 2×2 manifold.

In one embodiment, shock 10 may reproduce five independent damping configurations via spool valve 26. Thus, with a vehicle having four shocks according to this embodiment, a matrix of twenty independent damping configurations may be reproduced. In another embodiment, shock 10 may be configured where spool valve 26 is adapted to be controlled to finely meter flow, thus, allowing the user to create damping forces anywhere inside the range of the plurality of damping forces possible with shock 10. In this embodiment, an infinite number of independent damping configurations may be reproduced.

A quick disconnect hydraulic fitting 34 may be included on shock 10. Quick disconnect hydraulic fitting 34 may be for allowing quick connection and disconnection to the hydraulic fluid within shock 10. Quick disconnect hydraulic fitting 34 may be for any purpose, including, but not limited to, allowing corner coupling of multiple shocks 10. In a standard vehicle, corner coupling allows the hydraulics from the front right shock to be coupled to the hydraulics from the rear left shock and the hydraulics from the font left shock to be coupled to the hydraulics from the rear right shock. In one embodiment, as shown in FIGS. 1-4, quick disconnect hydraulic fitting 34 may include a compression quick disconnect hydraulic fitting 34 and a rebound quick disconnect hydraulic fitting 34. This embodiment may allow corner coupling of both the compression and rebound chambers of the bleed circuits from multiple shocks 10.

Figure 7:
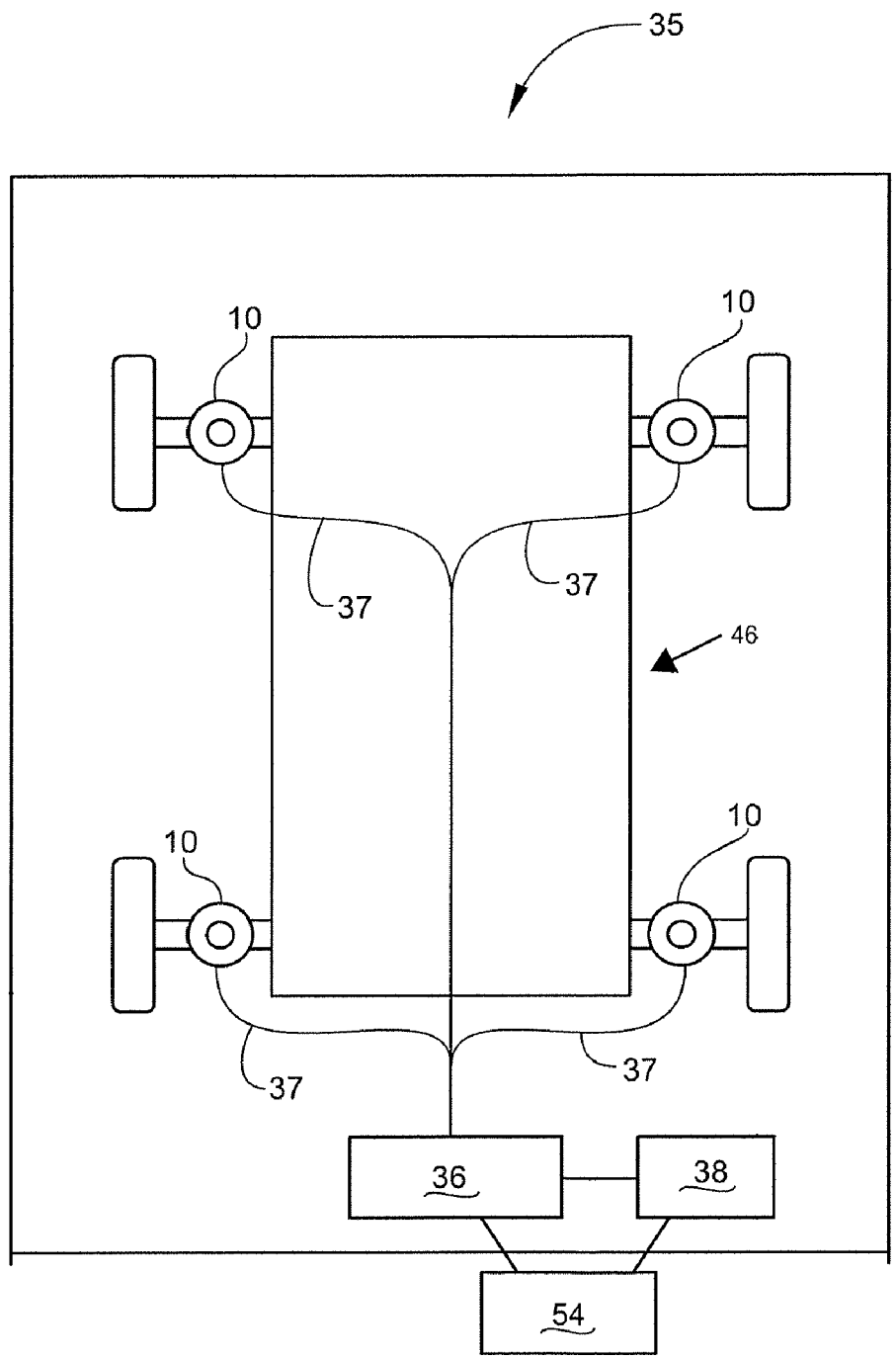
FIG. 7 shows a diagram of one embodiment of the system for optimizing a vehicle's suspension according to the instant invention.

Referring to FIG. 7, a system 35 for optimizing a vehicle's suspension is shown. In one embodiment of the instant invention, system 35 may include four shocks 10. In this embodiment, system 35 includes a shock 10 for each suspension component of the vehicle (i.e., for each wheel). Thus, in any standard four wheel vehicle, system 35 may include four shocks 10. However, it is contemplated that system 35 can include any number of shocks 10. In addition to any number of shocks 10, system 35 may include an electronic control unit 36, and may additionally include a display module 38, a wiring harness 37, and software 54.

Electronic control unit 36 (also may be referred to as "ECU"), may be included with system 35 as shown in FIG. 7. Electronic control unit 36 may be for adjusting the damping forces of shock 10. Electronic control unit 36 may also be for reading the plurality of sensors 12. Electronic control unit 36 may be any device for adjusting the damping forces of shock 10 and/or reading the plurality of sensors 12. Electronic control unit 36 may also be for supplying power and memory to system 35. Electronic control unit 36 may supply any amount of power, including, but not limited to, 7.9 to 16.0 Volts of direct current. Electronic control unit 36 may also supply any amount of memory to system 35, including, but not limited to 16 MB to 512 MB of data storage. Electronic control unit 36 may include any number of desired extra features, including, but not limited to, an Ethernet telemetry, CAN Bus ports to transmit data to other systems, Lap Beacon interface for on-track use, and/or RS232 Ports. In one embodiment, electronic control unit 36 may be a TAG-400 electronic control unit from McLaren® Electronics of the United Kingdom.

Display module 38 may also be included with system 35, as shown in FIG. 7. Display module 38 may be for displaying the data collected and controlled by electronic control unit 36. Display module 38 may be any device capable of displaying the data collected and controlled by electronic control unit 36. Display module 38 may also be for providing the status of system 35 and may be user configurable to display collected data in graphical or numeric formats. Display module 38 may include any number of desirable features, including, but not limited to, a color display, 64 brightness levels, 12 general purpose analog inputs, 10-bit alarm indicator LEDS, Virtual LEDS for providing further alarms, and/or push controls for display control. Display module 38 may include any size screen, including, but not limited to a 6.5 inch screen. Display module 38 may be any weight, including, but not limited to weighing approximately 650 grams. Display module 38 may be positioned within the automobile, say for on-track testing, or outside the automobile for stationary tests, like a seven post test. Display module 38 may be adapted for allowing the user to control system 35. For instance, display module 38 may allow the user to choose predefined damper maps and display the operating status of system 35. In one embodiment, display module 38 may be a PCU-400 TFT Display Module from McLaren® Electronics of the United Kingdom.

Wiring harness 37 may also be included in system 35, as shown in FIG. 7. Wiring harness 37 may be for linking any components of system 35. Wiring harness 37 may be any device for linking the components of system 35. Wiring harness 37 may be for linking the sensors 12 and spool valve 26 with the electronic control unit 36. Wiring Harness 37 may have any configuration required for linking system 35. Wiring harness 37 may also have any number of desirable features, including, but not limited to, a fully shielded assembly, Deutsch AS connectors, and/or BERU in-line load cell amplifiers. Wiring harness 37 may be any weight, including, but not limited to approximately 2 kg. In one embodiment, wiring harness 37 may include an optional 12 volt power supply. In another embodiment, wiring Harness 37 may be a fully shielded wiring harness assembly from Raychem® of Menlo Park, Calif.

Software 54 may also be included in system 35, as shown in FIG. 7. Software 54 may be for running system 35. Software 54 may be any software for running system 35. As such, software 54 may be for calculating and displaying the results of the testing of shock 10. Software 54 may be highly customizable to calculate and display any property tested on shock 10. Software 54 may include any number of desirable features, including, but not limited to, a graphical timeline for easy navigation through data, the capability to view, analyze and compare live telemetry data with uploaded logged data, fast data handling to deal in real-time with large quantities of data, and/or the capability of open and closed loop control algorithms for user defined damping curves. In one embodiment, software 54 may be any tool for data plotting and analysis, like an Atlas Lite Interpretation Software with a dongle license key.

In one embodiment, software 54 may include software on a laptop, or any other computer device, and software in electronic control unit 36. These two separate softwares may be separate entities which communicate with each other. The software in the laptop, or other computer device, may monitor and control system 35, while reading the parameters within the software in electronic control unit 36. Thus, electronic control unit 36 may be the software where control algorithm calculations are taking place. However, system 35 may also operate without the use of a laptop or other computer device.

In operation of system 35, during every test cycle, all sensors 12 may be measured for each shock 10. This may include measuring load sensor 14, stroke sensor 16, velocity sensor 18, compression and rebound pressure sensors 20*a* and 20*b*, temperature sensor 22, acceleration sensor 24, and/or any other sensors provided on shock 10. These measurements send values to software 54, where such properties as shock velocity and pressure difference between compression and rebound may be calculated via software 54. Also included in software 54 may be any necessary digital filtering of signals in order to reduce or eliminate the effects of electrical/mechanical noise in the signals from sensors 12. While reading sensors 12, software 54 may monitor the current supplied to spool valve 26. Software 54 may then specify a current in mA to spool valve 26 which may correspond to an increase of opening 30 (in compression or rebound) of the bleed circuit 28. This current will determine the damping force generated by shock 10 while being tested. For every processor cycle of electronic control unit 36, for instance 1 millisecond, software 54 may calculate the pressure drop across the piston of shock 10 (the difference between the compression and rebound pressure from pressure sensors 20*a* and 20*b*, respectively). In a fixed compression or rebound bleed mode, software 54 may use the mathematical sign of the pressure difference to determine if shock 10 is loaded in compression or rebound.

In one embodiment, software 54 may include a pressure map mode where the calculated pressure difference may be cross referenced with a pressure drop vs. current table, specified by the user. Values that fall between specified break points are interpolated and may be used to determine current output to spool valve 26. The pressure map vs. spool current method may allow the user to dictate the bleed circuit opening 30 (compression or rebound) as a function of pressure drop across the piston which may also be a function of shock velocity. This way the low speed (nose) damping can be controlled independently of the high speed damping. For example, there can be a lot of bleed at small pressure differences/low speed and very little bleed at large pressure difference/high speed.

In another embodiment, further damping characteristics can be dictated with a hysteretic map provided in software 54. The hysteretic map may offer different spool current based on rising pressure vs falling pressure. For example, if the pressure difference is positive and rising a specified current value may be supplied to the spool valve and if the pressure difference is positive and falling a different specified current can be supplied to the spool valve. The pressure map technique may allow the user to mimic common mechanical components such as spring loaded jets and needles found in passive hydraulic shocks.

In another embodiment, software 54 may include optimizing software. The optimizing software may be used to manipulate shock settings using an algorithm based on the performance characteristics defined by the car's dynamic behavior.

In another embodiment, system 35 may include flexible control architecture. The flexible control architecture may use an available sensor to allow the creation of closed or open loop control to the spool valve 26.

In yet another embodiment, system 35 may be designed to be integrated into the seven post testing method. In this embodiment, system 35 may be used to repeatedly test the car with the same inputs while recording and analyzing how the changes made to the vehicle setup (i.e. springs, shocks, etc.) affect the dynamic and quasi-static response to the inputs. This integration may speed up testing time and allow for greater amounts of data to be collected. To this end the system software 54 may be designed to download large user defined tables with different shock settings and automatically step through each setting and capture the desired data using a trigger signal from the seven post test equipment. This may allow multiple setups to be tested concurrently with no human intervention to change shock settings.

Figure 8:
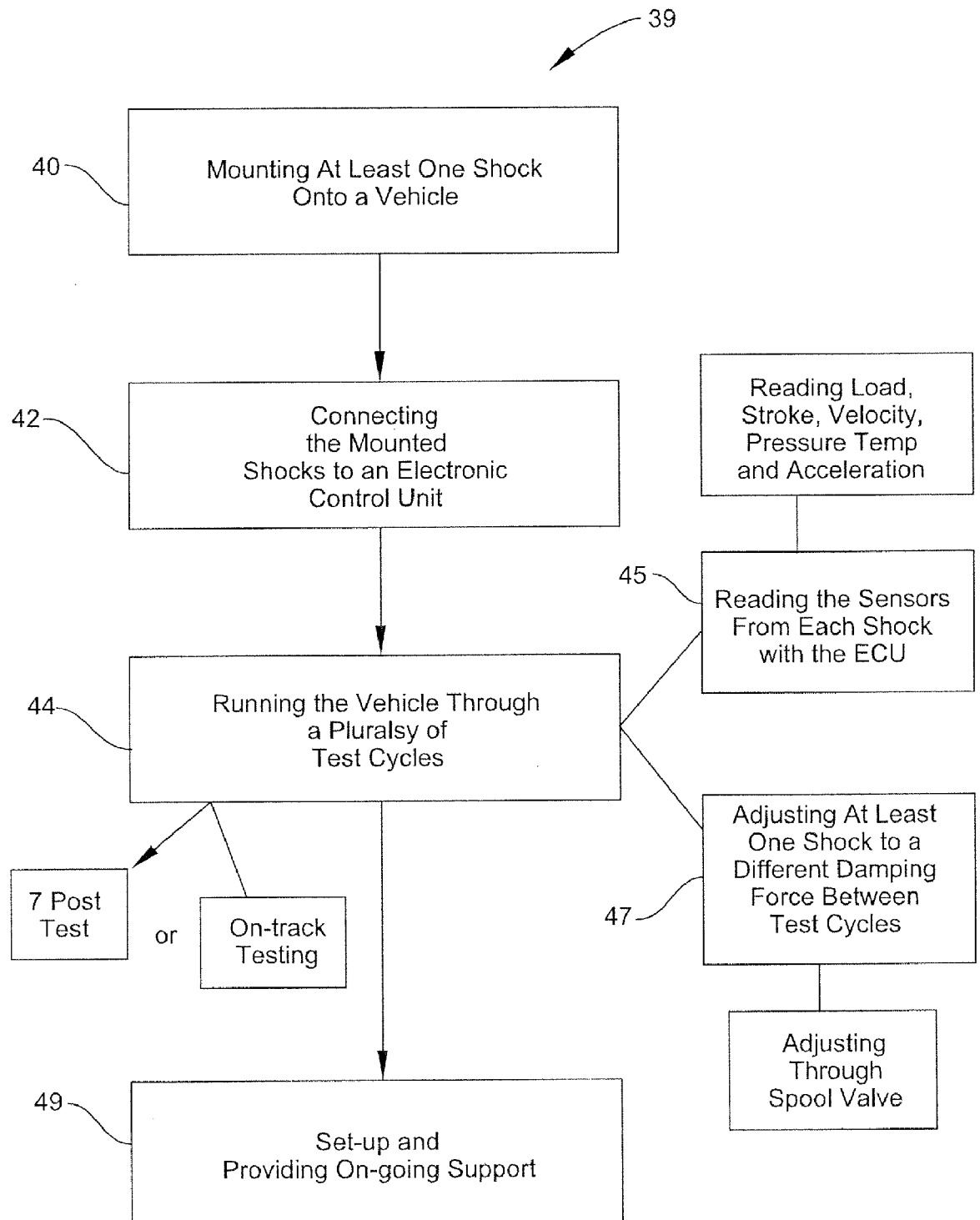
FIG. 8 shows a flow chart of one embodiment of the method for optimizing a vehicle's suspension according to the instant invention.

As shown in FIG. 8, a method 39 for optimizing the suspension of a vehicle may be included in the instant invention. Method 39 may be for optimizing the suspension of any vehicle, including but not limited to an automobile, and more particularly, a racing automobile, like a NASCAR® racecar. Method 39 may comprise, but is not limited to, the following steps: a step 40 of mounting at least one shock 10 onto a vehicle; a step 42 of connecting the mounted shocks 10 to electronic control unit 36; and a step 44 of running the vehicle through a plurality of test cycles including the steps of, a step 45 of reading sensors 12 for each shock 10 with electronic control unit 36 during each test cycle, and a step 47 of adjusting at least one shock 10 to a different damping force between each test cycle, where said adjusted shock 10 may emulate the damping forces of multiple standard passive shocks. Method 39 of optimizing the suspension of a vehicle may include measuring the properties, including, but not limited to: load, stroke, velocity, pressure, temperature, acceleration, and any combination of properties thereof from shock 10 These measured properties may then be utilized to optimize the suspension of the vehicle set up.

Step 40 of mounting at least one shock 10 onto a vehicle may be included in method 39, as shown in FIG. 8. Step 40 may include any steps required for mounting at least one shock 10 onto a vehicle. Step 40 may include mounting any number of shocks 10 onto the vehicle, including, but not limited to, mounting four shocks 10 onto a standard four wheel vehicle. Any conventional or known method of mounting shocks 10 onto a vehicle is contemplated by step 40. In one embodiment, shock 10 may be provided in any length, and may include a 360 degree rotation manifold for allowing step 40 of mounting onto practically any vehicle.

Step 42 of connecting each mounted shock 10 to electronic control unit 36 may be included in method 39, as shown in FIG. 8. Step 42 may include any steps for connecting each mounted shock 10 to electronic control unit 36. Step 42 may include connecting sensors 12 and spool valve 26 from each mounted shock 10 to electronic control unit 36. Step 42 may include connecting sensors 12 and spool valve 26 to electronic control unit 36 from each mounted shock 10 with any device, including, but not limited to, wiring harness 37.

Step 44 of running the vehicle through a plurality of test cycles may be included in method 39, as shown in FIG. 8. Step 44 may include any steps for running the vehicle through a plurality of test cycles. Step 44 may include testing the vehicle on any road, racetrack or testing equipment, including, but not limited to, a seven post test or on track testing. Step 44 of running test cycles may include: a step 45 of reading sensors 12 from each shock 10 with electronic control unit 36 during each test cycle, and a step 47 of adjusting at least one shock 10 to a different damping force between each test cycle, where shock 10 may emulate the damping forces of multiple standard passive shocks.

Step 45 of reading sensors 12 with electronic control unit 36 during each test cycle may be included in method 39, as shown in FIG. 8. Step 45 may be included within step 44 of running the vehicle through a plurality of test cycles in method 39. Step 45 may include any steps for reading sensors 12 during each test cycle. Step 45 may include reading any properties of shock 10, including, but not limited to the properties of: load, stroke, velocity, pressure, temperature, acceleration, and any combination thereof. Step 45 may include sending the properties read from sensors 12 of each mounted shock 10 to software 54, where software 54 may aid the user in optimizing the suspension of the vehicle tested.

Step 47 of adjusting at least one shock 10 to a different damping force between each test cycle may be included in method 39, as shown in FIG. 8. Step 47 may be included within step 44 of running the vehicle through a plurality of test cycles in method 39. Step 47 may include any steps for adjusting at least one shock 10 to a different damping force. Step 47 may include adjusting the damping forces of any number of mounted shocks 10. Step 47 may include adjusting the damping forces of at least one shock 10 through spool valve 26, where spool valve 26 controls the opening 30 (compression or rebound) in the bleed circuit 28 of shock 10. Step 47 may include adjusting at least one shock 10 to any number of different damping forces between each test cycle, including, but not limited to, four different damping forces for each shock 10.

A step 49 of providing set-up and ongoing support may also be included in method 39, as shown in FIG. 8. Step 49 of providing set-up and ongoing support may include, but is not limited to, setting up system 35, and/or providing on-going assistance for system 35. This on-going assistance may include, but is not limited to, training and test support, continual updates and revisions of software 54, and/or annual maintenance, including complete shock rebuild and diagnostic checks.

Figure 9:
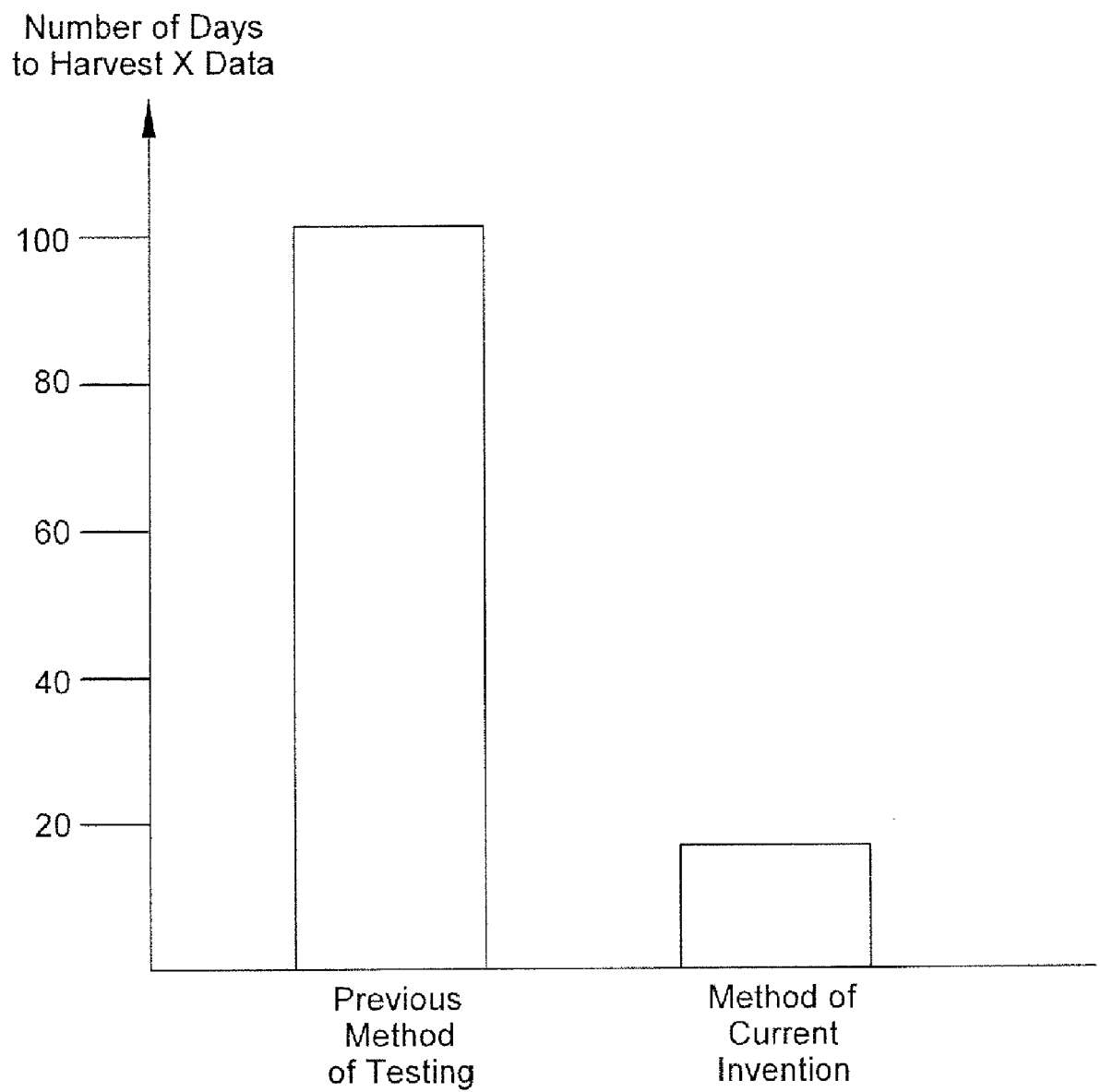
FIG. 9 shows a graph of the potential amount of time saved using one embodiment of the method of optimizing a vehicles suspension according to the instant invention.

As shown in FIG. 9, method 39 of optimizing the suspension of a vehicle may reduce the amount of time required to collect data when testing the suspension of a vehicle. For instance, the amount of time required for a seven post test may be reduced by at least 50%. In addition, method 39 eliminates the need to change shock setups in between test runs. Thus, up to five times more data may be collected utilizing method 39 in the same amount of time with previous testing. Furthermore, method 39 eliminates the risk of human error involved in changing shock setups between test runs by streamlining damper set-up changes. All of these features increase productivity and quality of testing, thereby saving considerable amount of time and financial expenses associated with testing.

The present invention may be embodied in other forms without departing from the spirit and the essential attributes thereof, and, accordingly, reference should be made to the appended claims, rather than to the foregoing specification, as indicated in the scope of the invention.

The invention claimed is:

1. A method for optimizing the suspension of a vehicle comprising the steps of:
   providing at least one passive shock;
   modifying each of said passive shocks including:
      adding a plurality of sensors to each of said passive shocks; and
      adding a spool valve to each of said passive shocks for controlling the opening in the bleed circuit;
   whereby each of said modified passive shocks being adjustable for a plurality of damping forces for emulating the damping forces of a standard passive shock;
   mounting at least one of said modified passive shocks onto a vehicle;
   connecting each said mounted shock to an electronic control unit;
   said electronic control unit being for controlling said spool valve for adjusting said damping forces of said shock and reading said plurality of sensors; and
   running the vehicle through a plurality of test cycles comprising the steps of:
      reading said plurality of sensors from each said shock with said electronic control unit during each test cycle; and
      adjusting at least one shock to a different damping force between each test cycle;
      where said shock emulating the damping forces of multiple standard passive shocks.

2. The method of optimizing the suspension of a vehicle according to claim 1 where the vehicle being an automobile.

3. The method of optimizing the suspension of a vehicle according to claim 2 where four shocks being mounted on said automobile, where one shock being mounted on each wheel of said automobile.

4. The method of optimizing the suspension of a vehicle according to claim 3 where said step of running the vehicle through a plurality of test cycles including said electronic control unit reading said plurality of sensors from all four of said shocks during each test cycle and adjusting at least one of said shocks to a different damping force between each test cycle.

5. The method of optimizing the suspension of a vehicle according to claim 1 where said plurality of sensors being for measuring the properties consisting of: load, stroke, velocity, pressure, temperature, acceleration, and any combination thereof.

6. The method of optimizing the suspension of a vehicle according to claim 1 where said step of running the vehicle through a plurality of test cycles including testing the vehicle on a seven post test.

7. The method of optimizing the suspension of a vehicle according to claim 6 whereby the amount of time required for said seven post test being reduced by at least 50% in comparison to the amount of time required for said seven post test without said modified passive shock being mounted to the vehicle.

8. The method of optimizing the suspension of a vehicle according to claim 1 where said step of running the vehicle through a plurality of test cycles including testing the vehicle on a track.

9. A system for optimizing the suspension of a vehicle comprising:
   at least one passive shock;
   each of said passive shocks being modified to include:
      a plurality of sensors;
      a spool valve for controlling the opening in the bleed circuit,
   whereby each of said modified passive shocks being adjustable for a plurality of damping forces for emulating the damping forces of a standard passive shock;
   an electronic control unit for controlling said spool valve for adjusting said damping forces of each of said modified passive shocks and reading said plurality of sensors.

10. The system for optimizing the suspension of a vehicle of claim 9 where the vehicle being an automobile.

11. The system for optimizing the suspension of a vehicle of claim 10 including four of said modified shocks, one modified shock for each wheel of said automobile.

12. The system for optimizing the suspension of a vehicle of claim 9 where said plurality of sensors include: a load sensor, a stroke sensor, a velocity sensor, a pressure sensor, a temperature sensor, an acceleration sensor, and any combination of sensors thereof.

13. The system for optimizing the suspension of a vehicle of claim 9 further including a display module for displaying the readings of said control unit.

14. The system for optimizing the suspension of a vehicle of claim 9 where said shock further including a quick disconnect hydraulic fitting.

15. The system for optimizing the suspension of a vehicle of claim 14 where said quick disconnect hydraulic fittings being adapted for allowing corner coupling, whereby the hydraulics from a front right shock being corner coupled to the hydraulics from a rear left shock and the hydraulics from a font left shock being corner coupled to the hydraulics from a rear right shock.

16. A shock for optimizing the suspension of a vehicle comprising:
   a passive shock;
   said passive shock being modified to include:
      a plurality of sensors; and
      a spool valve for controlling the opening in the bleed circuit,
   whereby said modified passive shock being adjustable for a plurality of damping forces by means of said spool valve controlling the opening in the bleed circuit for emulating the damping forces of multiple standard passive shocks.

17. The shock for optimizing the suspension of a vehicle of claim 16 where said plurality of sensors include: a load sensor, a stroke sensor, a velocity sensor, a pressure sensor, a temperature sensor, an acceleration sensor, and any combination of sensors thereof.

18. The shock for optimizing the suspension of a vehicle of claim 16 where said shock further including a quick disconnect hydraulic fitting.

19. The shock for optimizing the suspension of a vehicle of claim 16 where said spool valve allowing said shock to be adjustable for different damping forces for emulating the damping forces of four different standard passive shocks.

* * * * *